United States Patent

Kubota et al.

[11] Patent Number: 5,854,726
[45] Date of Patent: Dec. 29, 1998

[54] MAGNETIC HEAD DEVICE FOR DATA CARTRIDGE

[75] Inventors: Shoetsu Kubota; Koji Honda, both of Miyagi, Japan

[73] Assignee: Sony Corporation, Tokyo, Japan

[21] Appl. No.: 859,602

[22] Filed: May 20, 1997

Related U.S. Application Data

[63] Continuation of Ser. No. 603,382, Feb. 20, 1996, abandoned, which is a continuation of Ser. No. 285,727, Aug. 4, 1994, abandoned.

[30] Foreign Application Priority Data

Aug. 31, 1993 [JP] Japan .................................. 5-216766

[51] Int. Cl.⁶ .......................................................... G11B 5/29
[52] U.S. Cl. ............................................................. 360/121
[58] Field of Search .................................. 360/121, 123, 360/126, 119, 120, 125

[56] References Cited

U.S. PATENT DOCUMENTS

| | | | |
|---|---|---|---|
| 3,214,746 | 10/1965 | McCreary | 360/124 |
| 3,859,664 | 1/1975 | Chynoweth et al. | 360/121 |
| 3,881,191 | 4/1975 | Potter et al. | 360/121 |
| 5,276,575 | 1/1994 | Kobayashi | 360/126 |
| 5,307,217 | 4/1994 | Saliba | 360/121 |
| 5,394,285 | 2/1995 | Sundaram | 360/121 |

FOREIGN PATENT DOCUMENTS

A-0 115 052  8/1994  European Pat. Off. .
WO-A-92 02014  2/1992  WIPO .

OTHER PUBLICATIONS

Patent Abstracts of Japan , vol. 012, No. 361 (P–763), Sep. 28, 1988 and JP–A–63 112813 (Mitsubishi Electric Corp.), May 17, 1988.

Patent Abstracts of Japan, vol. 015, No. 111 (P–1180), Mar. 18, 1991 and JP–A–03 003107 (Toshiba Corp.), Jan. 9, 1991.

Patent Abstracts of Japan, vol. 010, No. 260 (P–494), Sep. 5, 1986 and Jp–A–61 085611 (Hitachi Maxwell Ltd.), May 1, 1986.

K. Kajiwara, et al., *Analysis of Metal–Ferrite Interface Layers in Metal–In–Gap Heads*, IEEE Transactions on Magnetics, vol. 26, No. 6, Nov. 1, 1990, pp. 2978–2982.

*Primary Examiner*—George J. Letscher
*Attorney, Agent, or Firm*—Hill & Simpson

[57] ABSTRACT

A magnetic head device for data cartridge including a recording head having a recording magnetic gap and a reproducing head having a reproducing magnetic gap united in one body is disclosed. The magnetic head device for data cartridge includes a first magnetic head element having a first magnetic gap, the first magnetic head element having center cores on both lateral sides thereof, second and third magnetic gaps formed by magnetic cores forming closed magnetic circuits in the center cores, the magnetic cores being bonded to each other via a gap member, the first to third magnetic gaps being arrayed in a magnetic recording medium rubbing direction, the magnetic cores forming the second and third magnetic gaps having inclined gap forming faces, the gap forming faces of the magnetic gaps extending in a depth direction in a manner non-parallel to one another, one of the first to third magnetic gaps being used as a recording magnetic gap, the recording magnetic gap having a magnetic metal film formed on the gap forming face thereof. The magnetic metal film is formed directly on the magnetic core without providing an underlying film.

6 Claims, 8 Drawing Sheets

MAGNETIC HEAD DEVICE FOR DATA CARTRIDGE

This is a continuation of application Ser. No. 08/603,382, filed Feb. 20, 1996, now abandoned, which in turn is a continuation of application Ser. No. 08/285,727 filed Aug. 4, 1994, now abandoned.

BACKGROUND OF THE INVENTION

This invention relates to a magnetic head device for data cartridge having a recording magnetic gap and a reproducing magnetic gap arrayed in a magnetic recording medium rubbing direction.

For a variety of computers, hard disks and flexible disks are generally used as information storage media. Also, disk cartridges are recently used for greater storage capacity.

The data cartridge is adapted for short-time reading and writing of information signals from and onto a magnetic tape contained in a cassette and running at a high speed. A multi-channel magnetic head device in which plural recording heads and reproducing heads are arrayed is usually employed for recording and reproducing information signals.

Meanwhile, so-called metal tapes and evaporation tapes are used as magnetic recording media in response to the recent tendency of increasing capacity of data. The metal tapes and the evaporation tapes have been developed to reduce effects of diamagnetic field or self-demagnetization. Also, an increase in capacity of data by thinning the magnetic tape is considered for application.

On the other hand, for increasing capacity of data, the magnetic head needs to be capable of high-density recording onto the magnetic tape of high coercive force.

However, if the magnetic tape of high coercive force is used, the conventional magnetic head employing the ferrite core is saturated before the tape is saturated. Therefore, satisfactory recording cannot be carried out.

Stated differently, though a sufficient magnetic field is outputted from the gap of the magnetic head for recording in the direction of thickness of the magnetic tape of high coercive force, a greater recording current than in the case of a magnetic tape of low coercive force needs to be carried, thus causing head saturation. The head saturation occurs mainly in the vicinity of the front gap, causing a pseudo gap which weakens the magnetic field from the main gap. Thus, characteristics of the magnetic tape cannot be sufficiently exhibited.

It is essential to narrow the gap for achieving the high-density recording. However, the above tendency is accelerated as the gap is narrowed. As a result, the recording efficiency is considerably deteriorated.

OBJECT AND SUMMARY OF THE INVENTION

In view of the above-described status of the art, it is an object of the present invention to provide a magnetic head device for data cartridge which is capable of recording onto a tape of high coercive force and achieving high capacity. It is another object of the present invention to provide a magnetic head for data cartridge which is satisfactory in manufacture yield and reliability.

According to the first aspect of the present invention, there is provided a magnetic head device for data cartridge including a recording head having a recording magnetic gap and a reproducing head having a reproducing magnetic gap united in one body, the recording head having a magnetic metal film formed on a magnetic gap forming face thereof.

If the magnetic metal film is formed by sputtering, magnetic permeability of the boundary face between a ferrite core and the magnetic metal film may be deteriorated, causing a pseudo gap. Although it is conceivable for this reason to bond $SiO_2$ or Ti on the boundary face for inhibiting oxidation of the ferrite core, the bond strength of the magnetic metal film is weakened. The data cartridge driving device performs digital recording, which is negligibly and less affected by the pseudo gap than analog recording is.

Consequently, in the magnetic head device for data cartridge of the present invention, it is preferred to bond the magnetic metal film directly to the ferrite core to prevent separation of the magnetic metal film. According to the second aspect of the present invention, in the structure of the first aspect of the present invention, the recording head is formed by a magnetic core of ferrite and a magnetic metal film is formed directly on the ferrite.

Also, the present invention is preferably applied to a magnetic head device in which magnetic cores are obliquely abutted to each other to form an inclined gap forming face so as to have a small space between a recording gap and a reproducing gap. According to the third aspect of the present invention, the magnetic head for data cartridge includes a first magnetic head element having a first magnetic gap, the first magnetic head element having center cores on both lateral sides thereof, second and third magnetic gaps formed by magnetic cores forming closed magnetic circuits in the center cores, the magnetic cores being bonded to each other via a gap member, the first to third magnetic gaps being arrayed in a magnetic recording medium rubbing direction. The magnetic cores forming the second and third magnetic gaps have inclined gap forming faces, and the gap forming faces of the magnetic gaps extend in a depth direction in a manner non-parallel to one another. One of the first to third magnetic gaps is used as a recording magnetic gap, and the recording magnetic gap has a magnetic metal film formed on the gap forming face thereof.

By forming the magnetic metal film having high saturation magnetic flux density on the gap forming face of the recording magnetic gap, it is possible to delay saturation of the head even with a greater recording current and to carry out recording onto a magnetic tape of high coercive force.

Also, by forming the magnetic metal film directly on the ferrite core without providing an underlying film, it is possible to improve bond strength and to prevent film peeling. Thus, it is possible to improve manufacture yield and to provide a highly reliable magnetic head device.

DETAILED DESCRIPTION OF THE PREFERRED EMBODIMENTS

A preferred embodiment of the present invention will now be described in detail with reference to the accompanying drawings.

Figure 1:
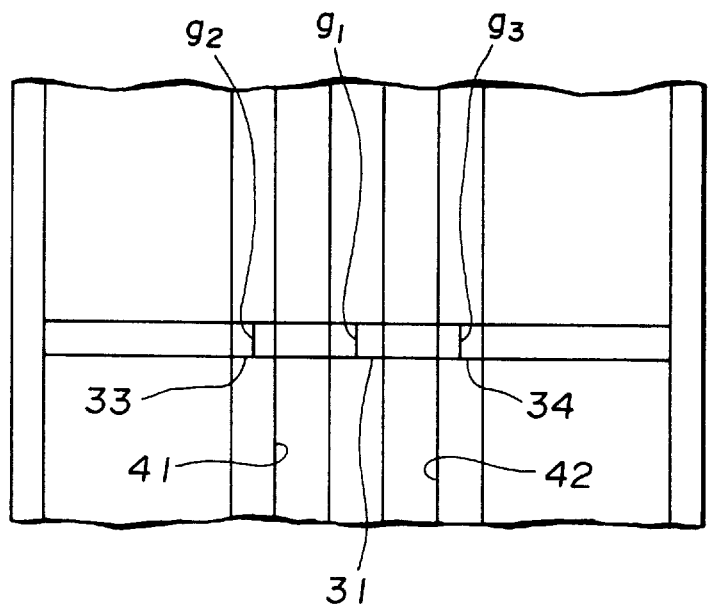
FIG. 1 is a plan view showing essential portions of an example of a magnetic head device according to the present invention.
Figure 2:
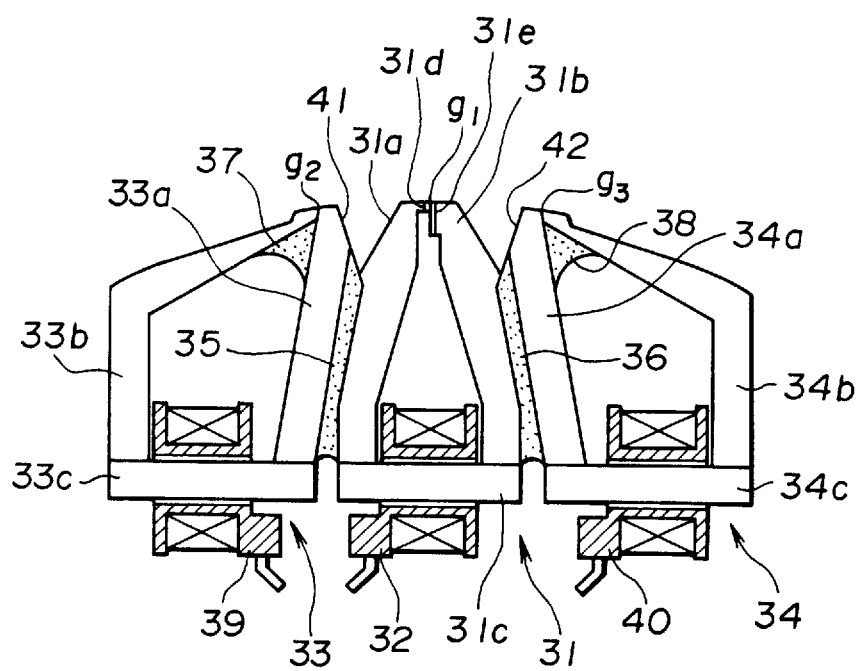
FIG. 2 is a side view, partly broken, showing an example of the magnetic head device according to the present invention.

A magnetic head device of the present embodiment has a recording gap $g_1$ at the center and reproducing gaps $g_2$, $g_3$ located on both sides in the magnetic tape running direction and sandwiching the recording gap $g_1$, as shown in FIGS. 1 and 2.

A recording magnetic head element 31 forming the recording gap $g_1$ is formed by a pair of magnetic cores 31a, 31b of ferrite bonded and united in one body via a gap member. The recording magnetic head element 31 has a back core 31c bonded to the back side thereof to form a closed magnetic circuit, and a coil bobbin 32 having a coil wound around it and being inserted in the back core 31c. Consequently, by providing a current to the coil, a recording magnetic field is generated in the closed magnetic circuit formed by the magnetic cores 31a, 31b and 31c.

Figure 3:
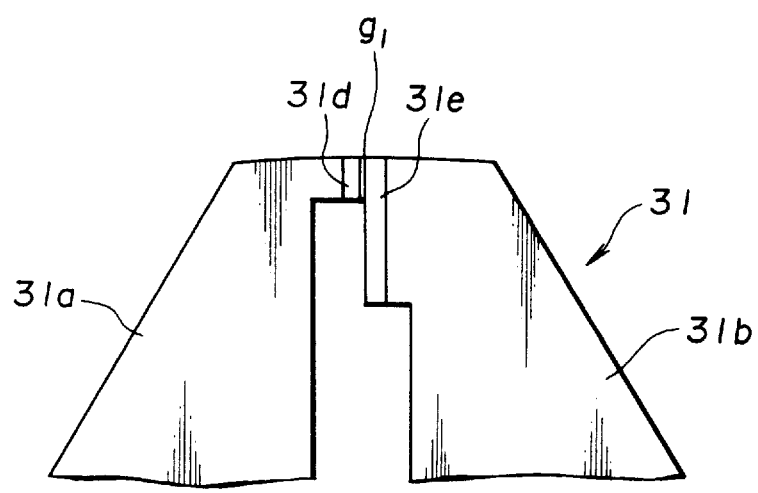
FIG. 3 is a an enlarged side view showing essential portions of the vicinity of a recording magnetic gap of a recording magnetic head element.

The magnetic gap forming faces of the recording magnetic head element 31 have magnetic metal films 31d, 31e, as shown in FIG. 3. The recording gap $g_1$ is formed between these magnetic metal films 31d, 31e. The magnetic metal films 31d, 31e are formed directly on the gap forming faces of the magnetic cores 31a, 31b of ferrite, respectively.

The magnetic metal films 31d, 31e are formed by a technique, such as, sputtering of soft magnetic metal materials of high saturation magnetic flux density. The usable soft magnetic metal materials are exemplified by Fe—Al—Si alloy, that is, so-called sendust, Fe—Ga—Si alloy, such as Fe—Ga—Si—Ru, and amorphous alloys of Fe—N, Fe—C, Co—Zr and Co—Nb.

Both lateral sides of the recording magnetic head element 31, that is, outer lateral sides of the magnetic cores 31a, 31b, are inclined faces. Along these inclined faces, center cores 33a, 34a of reproducing magnetic head elements 33, 34 forming the reproducing gaps $g_2$, $g_3$ are obliquely bonded by fusion of fusion glasses 35, 36.

The center cores 33a, 34a have substantially L-shaped side cores 33b, 34b bonded thereto with fusion glasses 37, 38. The gap forming faces of the reproducing gaps $g_2$, $g_3$ are inclined faces, which are not parallel to the gap forming faces of the recording gap $g_1$ in the depth direction.

The reproducing magnetic head elements 33, 34, similar to the recording magnetic head element 31, have back cores 33c, 34c bonded to the back sides thereof to form closed magnetic circuits, and coil bobbins 39, 40 with coils wound around them inserted in the back cores 33c, 34c, respectively, to taken out reproduction signals by electromagnetic conversion.

In this magnetic head device, since the gap forming faces of the reproducing gaps $g_2$, $g_3$ are inclined faces non-parallel to the gap forming faces of the recording gap $g_1$ in the depth direction, the space between the reproducing gaps $g_2$, $g_3$ and the recording gap $g_1$ can be diminished. However, it is difficult to provide in this space a shield plate required for improving the crossfield.

Thus, in the present embodiment, magnetic circuit separation grooves 41, 42, having V-shaped cross section and exposed to the magnetic recording medium rubbing surface, are formed between the recording gap $g_1$ and the reproducing gap $g_2$, and between the recording gap $g_1$ and the reproducing gap $g_3$, respectively, as shown in FIG. 2. Stated differently, the magnetic circuit separation grooves 41, 42 are formed by grinding, in the V-shaped cross section, the boundary part between the magnetic core 31a of the recording magnetic head element 31 and the center core 33a of the reproducing magnetic head element 33, and the boundary part between the magnetic core 31b of the recording magnetic head element 31 and the center core 34a of the reproducing magnetic head element 34, respectively.

By providing the magnetic circuit separation grooves 41, 42 in the magnetic recording medium rubbing surface, the spaces between the adjacent magnetic cores, that is, between the magnetic core 31a and the center core 33a, and between the magnetic core 31b and the center core 34a, are apparently widened for improving the crossfield.

When the space between the recording gap $g_1$ and the reproducing gaps $g_2$, $g_3$ is set to 1.5 mm, by setting the groove width of the magnetic circuit separation grooves 41, 42 to 0.8 mm, the crossfield reaches a level which does not cause any practical problem.

The cross section of the magnetic circuit grooves 41, 42 is arbitrarily determined. However, it is preferred to form a V-shaped cross section in order to have a largest possible volume of magnetic core and assuring the space between adjacent magnetic cores.

The structure of the magnetic head device of the present embodiment is as described above. It will be explained further in detail by describing the production method thereof.

Figure 4:
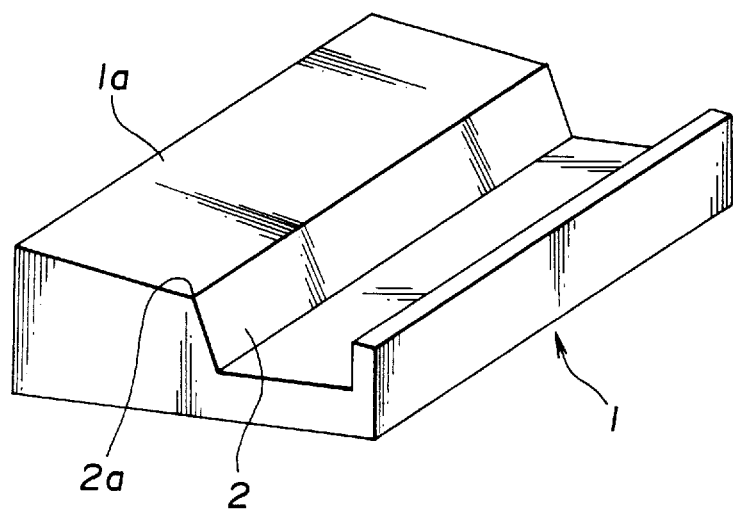
FIG. 4 is a perspective view showing a process of forming a glass groove in a reproducing core block, in a sequence of manufacturing processes for the magnetic head device according to the present invention.

To produce the magnetic head device, a reproducing magnetic head block is first formed. The reproducing magnetic head block is composed of a reproducing magnetic core block and a center core block. First, a block formed by a magnetic body is obliquely cut at a desired angle, to form the reproducing magnetic core block. Then, the inclined face of the reproducing magnetic core block is treated by figuring processing to form a glass groove 2 having an inclined part on one side thereof in the reproducing magnetic core block 1, for bonding the reproducing magnetic core block 1 and the center core block by glass fusion, as shown in FIG. 4.

The glass groove 2, which is for restricting the depth of the reproducing magnetic gap, is formed so that the distal end 2a of the inclined part of the glass groove 2 is located at a position such that the depth of the reproducing magnetic core block 1 is 0. On a gap forming face 1a of the reproducing magnetic core block 1, a gap member of SiO$_2$ or the like is formed by vacuum thin-film formation, such as, by sputtering.

Figure 5:
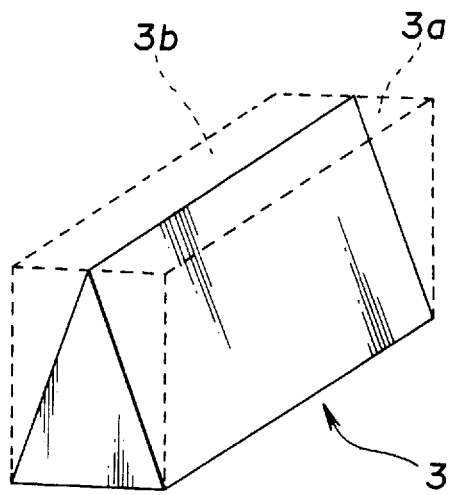
FIG. 5 is a perspective view showing a process of figuring a center core block.

The figuring processing of the center core block is now be described. Grind-away parts 3a, 3b, as indicated by a broken line in FIG. 5, on both shoulders of the prismatic block 3 of magnetic body are ground away. The grind-away parts 3a, 3b are inclined at such an angle as to coincide with the inclination of the reproducing magnetic cure block 1. On the inclined face of the center core block 3, a gap member of SiO$_2$ or the like is formed by vacuum thin-film formation, such as, by sputtering, as in the reproducing magnetic core block 1.

Figure 6:
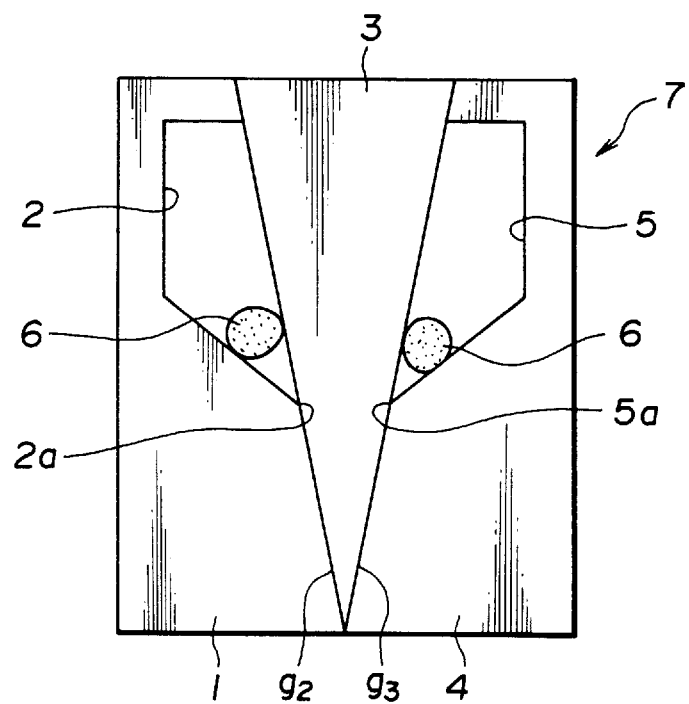
FIG. 6 is a front view showing a process of bonding the reproducing magnetic core block with the center core block to form a reproducing magnetic head block.
Figure 7:
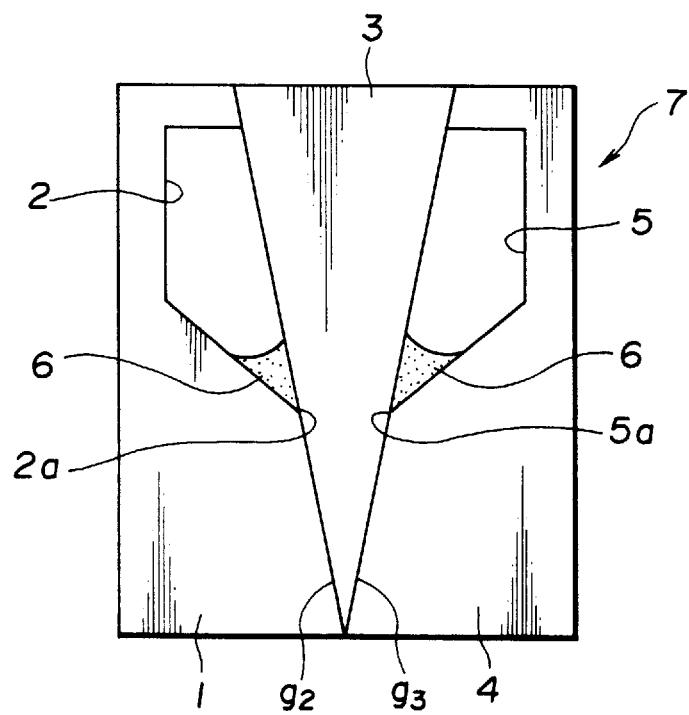
FIG. 7 is a side view showing the resulting reproducing magnetic head block.

The reproducing magnetic core block 1, the center core block 3, and a reproducing magnetic core block 4 formed in a manner similar to the reproducing magnetic core block 1 are bonded together. As shown in FIG. 6, the reproducing magnetic core block 1 and the reproducing magnetic core block 4 sandwich and support the center core block 3 so that the inclined faces of the reproducing magnetic core blocks 1, 4 contact the inclined faces of the center core block 3. A fusion glass 6 is provided in the glass grooves 2, 5 of the reproducing magnetic core blocks 1, 4, and is then press-heated, as shown in FIG. 7. The heights of distal ends 2a, 5a of the glass grooves 2, 5 of the reproducing magnetic core blocks 1, 4 are in conformity with each other. That is, the positions of the depth equal to 0 are in conformity. Thus, a reproducing magnetic head block 7 having two reproducing magnetic gaps g$_2$, g$_3$, as shown in FIG. 6, is formed.

Figure 8:
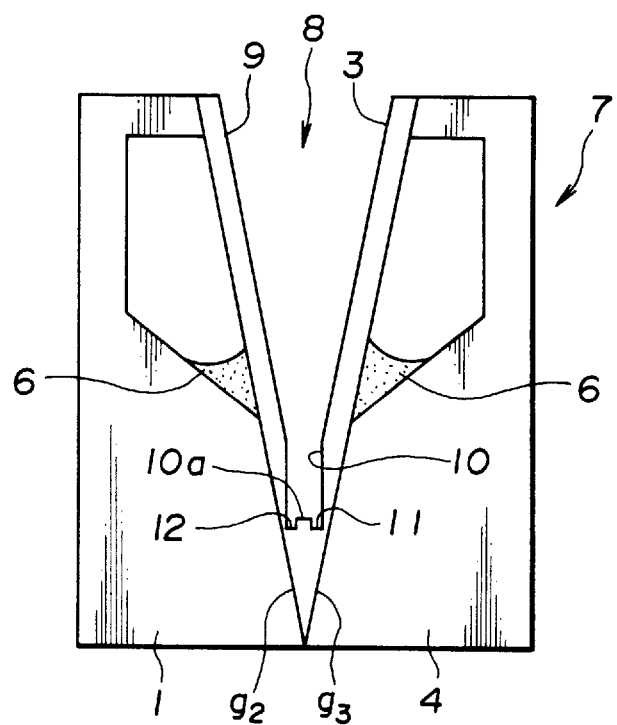
FIG. 8 is a side view showing a process of forming an interfitting groove for a recording magnetic head block in the reproducing magnetic head block.

A recording magnetic head block interfitting groove, as later described, is formed in the reproducing magnetic head block. A V-shaped cross section with a rectangular interfitting part on the bottom, that is, an interfitting groove 8 formed by an inclined part 9 and a rectangular interfitting part 10 having grooves 11, 12 on both side of the end of the inclined part 9, is formed in the center core block 3 of the reproducing magnetic head block 7 which is formed by the reproducing magnetic core blocks 1, 4 and the center block 3, as shown in FIG. 8.

For interfitting the recording magnetic head block, as described later, in the interfitting groove 8, the depth of the recording magnetic head block is determined by the interfitting position. Therefore, as the interfitting groove 8 is formed by the inclined part 9 and the rectangular interfitting part 10 having a bottom abutment face 10a, alignment of the depth of the recording magnetic head block is assured. Also, as the grooves 11, 12 are provided on both sides of the distal end of the interfitting part 10 for so-called recess processing, the interfitting of the recording magnetic head block is more assuredly carried out. The size, such as depth, of the interfitting groove 8 is set within a range capable of depth alignment of the recording magnetic head block and the reproducing magnetic head block 7.

Figure 9:
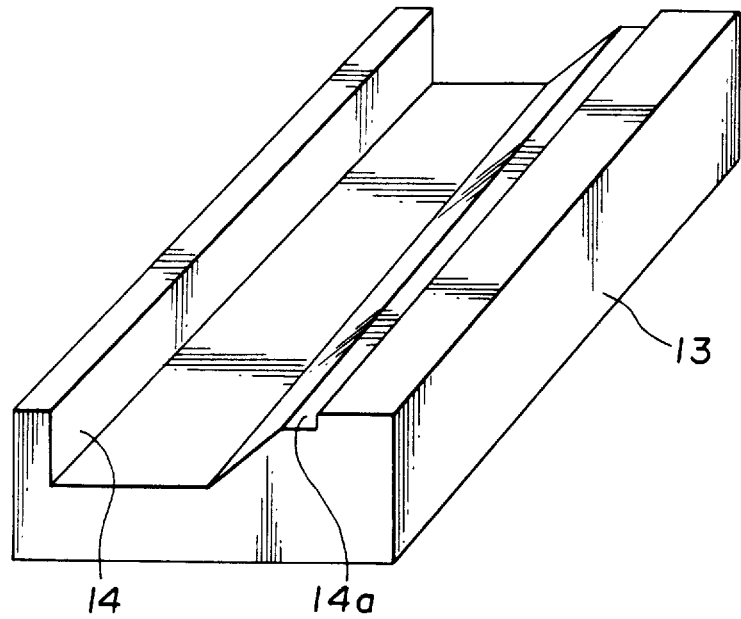
FIG. 9 is a perspective view showing a process of forming a glass groove in a block forming the recording magnetic head block.

The recording head block will now be formed. First, a glass groove 14 is formed in a block 13 of magnetic body forming one of the magnetic core blocks, so as to bonded to the other magnetic core block by fusion, as shown in FIG. 9. The glass groove 14 has its one side inclined to restrict the depth of the recording magnetic gap. A rectangular part 14a is formed on the distal end of the inclined face of the glass groove 14, so that the depth of the rectangular part 14a is at the position such that the depth is equal to 0. On a gap forming face 13a of the block 13, a magnetic metal film of sendust or the like is formed by sputtering, and a gap member of SiO$_2$ or the like is formed by vacuum thin-film formation, such as, by sputtering.

Then, a glass groove is formed also in the block forming the other magnetic core block so that the abutment face depth of the magnetic core block is greater than the depth of the previous magnetic core block. As the abutment face of one magnetic core block is greater than the gap forming face of the other magnetic core block, it is possible to form a predetermined depth determined by the magnetic gap forming face of the latter magnetic core block even with more or less deviations. A magnetic metal film is also formed on the gap forming face of the magnetic core block.

Figure 10:
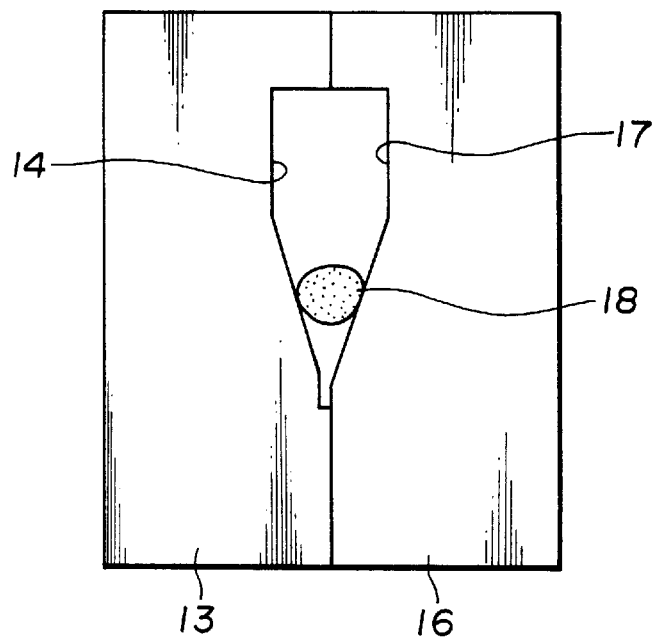
FIG. 10 is a side view showing a process of bonding a pair of blocks to form the recording magnetic head block.
Figure 11:
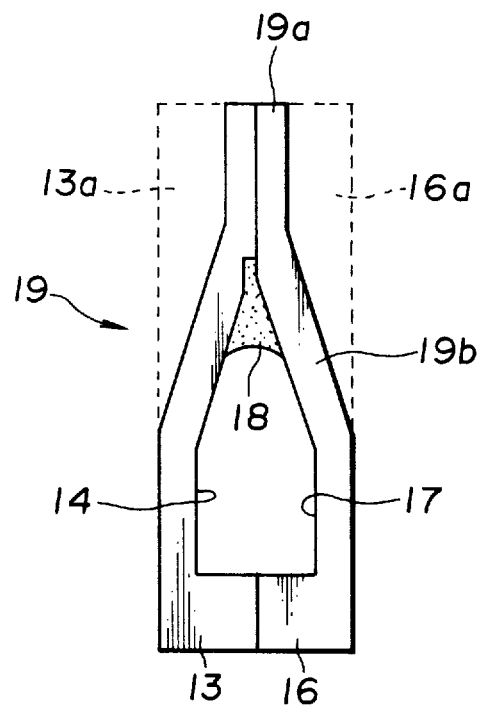
FIG. 11 is a side view showing a process of grinding the recording magnetic head block.

The resulting block 13 is contacted with a block 16 similarly produced, and a fusion glass is provided in the glass grooves 14, 17 for bonding by heat-pressing, as shown in FIG. 10. The recording magnetic head block 19 as shown in FIG. 11 is thus produced. Then, counter-bearing is carried out on the recording magnetic head block 19, as shown in FIG. 11. Stated differently, grind-away parts 13a, 16a as indicated by a broken line are ground away in a shape substantially along the interfitting groove 8 so that the recording magnetic head block 19 is interfitted with the interfitting part 10 of the interfitting groove 8 of the reproducing magnetic head block 7, and so that the depth alignment of the recording magnetic head block 19 and the reproducing magnetic head block 7 is possible.

The recording magnetic head block 19 from which the grind-away parts 13a, 16a have been ground away is formed by an inclined part 19b corresponding with a small space to the inclined part 9 of the interfitting groove 8 of the reproducing magnetic head block 7 and a rectangular protrusion 19c interfitted with the interfitting part 10 of the interfitting groove 8. By matching a distance between the abutment face 10a of the interfitting part 10 of the interfitting groove 8 of the reproducing magnetic head block 7 and the position of the depth 0 of the reproducing magnetic head block 7 with a distance between the distal end of the protrusion 19c of the recording magnetic head block 19 and the position of the depth 0 of the recording magnetic head block 19, it is possible to easily carry out the depth alignment of the reproducing magnetic head block 7 and the recording magnetic head block 19.

Figure 12:
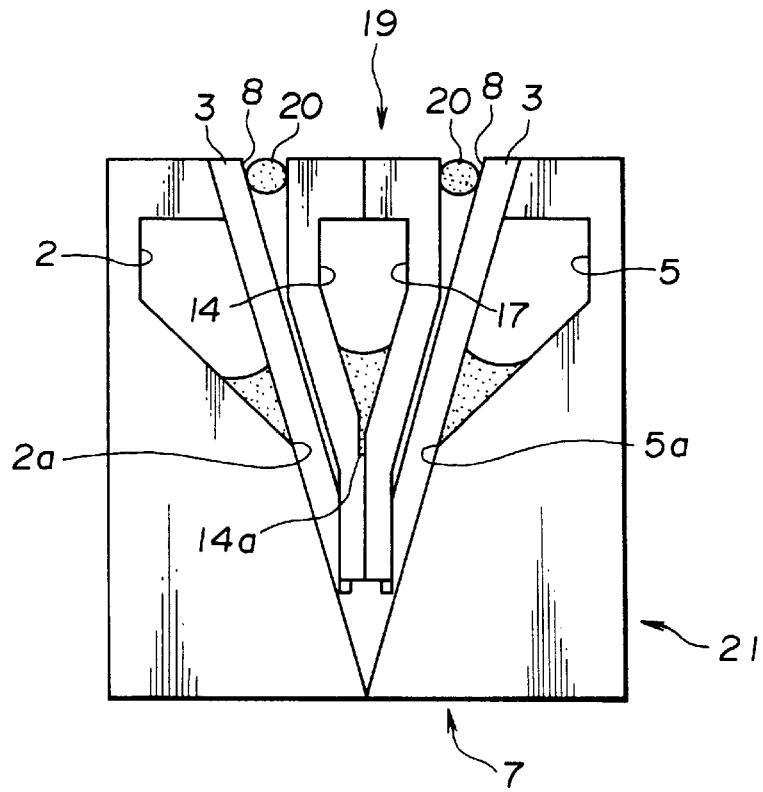
FIG. 12 is a side view showing a process of bonding the reproducing magnetic head block with the recording magnetic head block.

The reproducing magnetic head block and the recording magnetic head block are bonded to each other. As shown in FIG. 12, the recording head block 19 is interfitted with the interfitting groove 8 of the center core block 3 of the reproducing magnetic head block 7, and the a fusion glass 20 is provided in a space between the reproducing magnetic head block 7 and the recording magnetic head block 19 to bond the magnetic head blocks to each other by heat-pressing. The magnetic head block 21 is thus produced.

Since the distance between the abutment face 10a of the interfitting groove 8 of the reproducing magnetic head block 7 and the position of depth 0 of the reproducing magnetic head block 7 is matched with the distance between the distal end of the protrusion 19c of the recording magnetic head block 19 and the position of depth 0 of the recording magnetic head block 19, the distal ends 2a, 5a of the glass grooves 2, 5 of the reproducing magnetic head block 7 and the distal end 14a of the glass groove 14 of the recording magnetic head block 19 are in conformity with one another in height, Thus, the depths of the reproducing magnetic head block 7 and the recording magnetic head block 19 can be matched easily and correctly.

Figure 13:
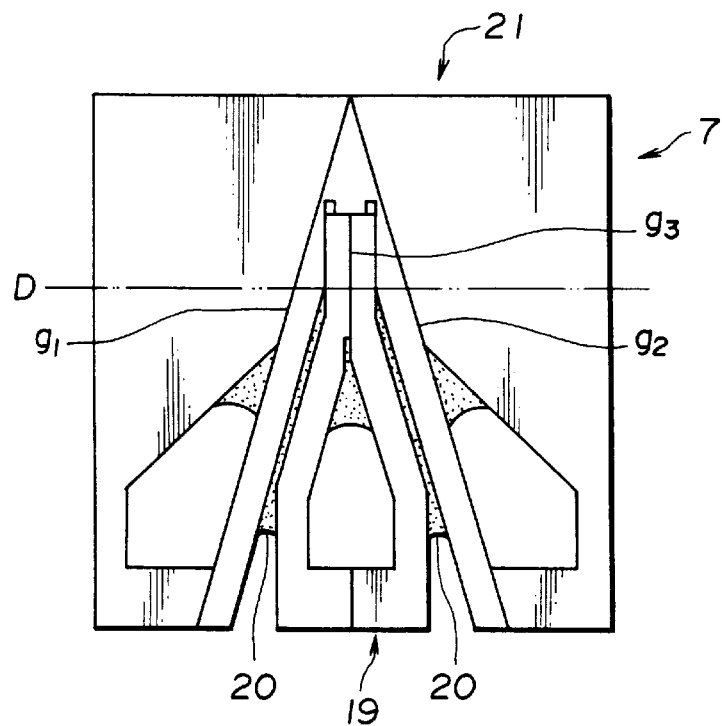
FIG. 13 is a side view showing the resulting magnetic head block.

The medium rubbing face and the back side of the magnetic head block thus produced are ground under predetermined conditions, and the resulting product is sliced into chips to form a magnetic head. That is, grinding is carried out on a grind-away face D of the magnetic head block 21 such that desired depth can be formed at points $g_1$, $g_2$ and $g_3$, as shown in FIG. 13. The protrusion of the recording magnetic head block 19 and the interfitting part 10 of the interfitting part 8 of the reproducing magnetic head block 7 are ground away.

The structure of the magnetic head device of the present embodiment is as described above. However, since the magnetic metal films 31d, 31e of soft magnetic metal material of high saturation magnetic flux density are formed on the gap forming face of the recording magnetic head element 31, the saturation of the head can be delayed even with a slightly deep recording current. Thus, recording onto a high coercive force magnetic tape is possible.

Figure 14:
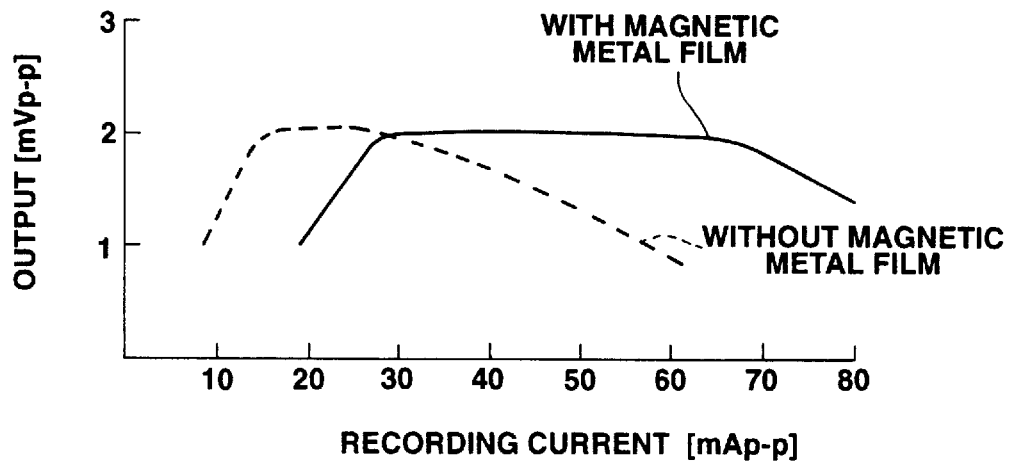
FIG. 14 is a graph showing difference between output properties with and without a magnetic metal film.

FIG. 14 shows output characteristics with and without the magnetic metal film formed on the gap forming face. As is apparent from FIG. 14, a reduction in output is observed at recording currents of 30 mA or greater without the magnetic metal film, while a reduction in output is not observed even at the recording current of 60 mA with the magnetic metal film.

In the present embodiment, since the magnetic metal films 31d, 31e are formed directly on the gap forming faces of the magnetic cores 31a, 31b of ferrite without having an underlying film of $SiO_2$, the bond strength can be improved and film peeling can be significantly prevented.

The present invention is applied to the above embodiment. However, it is to be understood that the present invention is not limited to the embodiment. For instance, in the magnetic head device of the above embodiment, the reproducing gap, the recording gap and the reproducing gap are arrayed in this order. However, the order of the recording gap, the reproducing gap and the recording gap may be employed.

Figure 15:
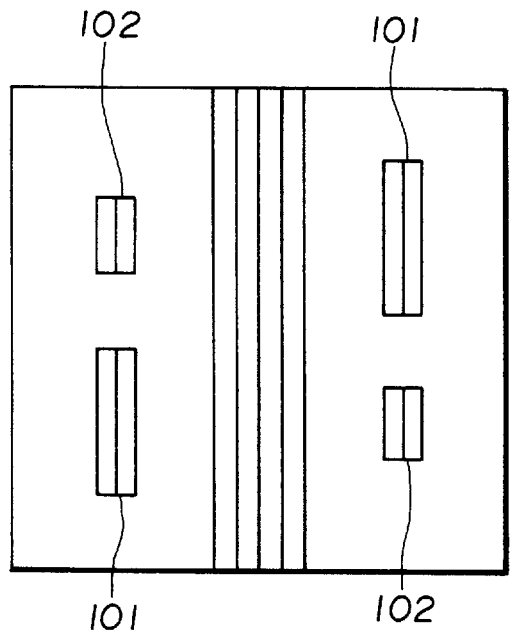
FIG. 15 is a plan view showing another example of a magnetic head device according to the present invention.

The present invention can also be applied to a multi-channel magnetic head device of the structure as shown in FIG. 15. The magnetic head device for data cartridge as shown in FIG. 15 has a recording head 101 and a reproducing head 102 arrayed in a magnetic tape running direction, with each of the heads 101, 102 being formed by a pair of magnetic cores.

In the present embodiment, in accordance with the magnetic tape running direction, that is, the right and left directions of FIG. 15, two sets of the recording head 101 and the reproducing head 102 are arrayed in parallel, with the relative positions thereof reversed.

In the magnetic head device of this structure, since the leakage of signals to an adjacent magnetic core raises a problem of crossfield, a shield plate 103 is inserted between the recording head 101 and the reproducing head 102.

In the magnetic head device of the above problem, the saturation of the head can be prevented by forming the magnetic metal film on the magnetic gap forming face of the recording head 101, and the recording onto a high-coercive force magnetic tape is possible.

The structure of the multi-channel magnetic head device is not limited to this example. A multi-channel head in which plural arrays of R (reproducing)—W (recording)—R (reproducing) are provided in parallel, or a multi-channel head in which plural arrays of W (recording)—R (reproducing)—W (recording) are provided in parallel, can be employed.

What is claimed is:

1. A magnetic head device for high density recording and reproducing in a data cartridge, comprising three magnetic head elements bonded together so as to form a unitary body and arrayed serially along a line in a direction of relative movement between the three magnetic head elements and a magnetic recording medium, and magnetic circuit separation grooves positioned between the magnetic head elements, each groove having a V-shaped cross section and being exposed to the magnetic recording medium;

wherein:
one of the magnetic head elements comprises a recording head having a recording magnetic gap,
another of the magnetic head elements comprises a reproducing head having a reproducing magnetic gap,
the recording head is formed of two core halves bonded together and having high saturation magnetic flux density metal films bonded directly onto respective magnetic gap forming faces of the core halves,
the middle magnetic head element of the three serially arrayed magnetic head elements formed of core halves which are inclined toward each other and having outer inclined faces which are inclined toward each other;
each of the outermost magnetic head elements of the three serially arrayed magnetic head elements being formed of core halves bonded together, the magnetic cores of the outermost magnetic head elements forming magnetic gaps having inclined gap forming faces, the gap forming faces of the magnetic gaps extending in a depth direction in a manner non-parallel to one another;
the magnetic cores of the outer magnetic head elements being obliquely bonded to the outer inclined faces of the middle magnetic head element;
each of the magnetic head elements having back cores bonded to back sides thereof to form closed magnetic circuits;
the magnetic core halves of the middle magnetic head being distinct and different from the core halves of the outer magnetic heads.

2. The magnetic head device of claim 1, wherein the recording head is formed by a ferrite magnetic core ferrite.

3. The magnetic head device of claim 1, wherein the magnetic metal films are composed of at least one material selected from the group consisting of Fe—Al—Si based alloy, Fe—Ga—Si based alloy, Fe-n based amorphous alloy and Fe—C based amorphous alloy.

4. The magnetic head device of claim 3, wherein the magnetic metal films are composed of Fe—Ga—Si—Ru.

5. The magnetic head device of claim 3, wherein the middle magnetic head element is the recording head.

6. The magnetic head device of claim 3, wherein the other magnetic head elements are recording heads and the middle head is a reproducing head.

* * * * *